United States Patent
Kaplan

(10) Patent No.: US 8,519,554 B2
(45) Date of Patent: Aug. 27, 2013

(54) DEVICE AND METHOD FOR HARVESTING ENERGY FROM FLOW-INDUCED OSCILLATIONS

(75) Inventor: A. Morris Kaplan, Rockville, MD (US)

(73) Assignee: A. Morris Kaplan, Rockville, MD (US)

( * ) Notice: Subject to any disclaimer, the term of this patent is extended or adjusted under 35 U.S.C. 154(b) by 403 days.

(21) Appl. No.: 12/903,164

(22) Filed: Oct. 12, 2010

(65) Prior Publication Data

US 2011/0084493 A1    Apr. 14, 2011

Related U.S. Application Data

(63) Continuation-in-part of application No. 12/577,393, filed on Oct. 12, 2009, now Pat. No. 8,258,644.

(51) Int. Cl.
*H02K 35/00* (2006.01)
(52) U.S. Cl.
USPC .......................................................... 290/1 R
(58) Field of Classification Search
USPC ............................................................ 290/54
See application file for complete search history.

(56) References Cited

U.S. PATENT DOCUMENTS

| | | | |
|---|---|---|---|
| 4,184,805 A | 1/1980 | Arnold | |
| 5,223,763 A | 6/1993 | Chang | |
| 5,751,091 A | 5/1998 | Takahashi et al. | |
| 5,801,475 A | 9/1998 | Kimura | |
| 6,041,022 A | 3/2000 | Tu et al. | |
| 6,593,666 B1 * | 7/2003 | Pinkerton | 290/1 R |
| 7,199,480 B2 | 4/2007 | Fripp et al. | |
| 7,208,845 B2 | 4/2007 | Masters et al. | |
| 7,345,372 B2 * | 3/2008 | Roberts et al. | 290/1 R |
| 7,498,682 B2 | 3/2009 | Lemieux | |
| 7,504,764 B2 | 3/2009 | Chang et al. | |
| 7,514,804 B2 | 4/2009 | Wang | |
| 7,560,856 B2 | 7/2009 | Chen | |
| 7,569,952 B1 * | 8/2009 | Bono et al. | 310/15 |
| 7,573,143 B2 | 8/2009 | Fryne | |
| 7,626,281 B2 | 12/2009 | Kawai | |
| 7,633,175 B1 | 12/2009 | Wilson | |
| 7,772,712 B2 | 8/2010 | Frayne | |

(Continued)

FOREIGN PATENT DOCUMENTS

| | | |
|---|---|---|
| JP | 2001157433 | 6/2001 |
| JP | 2003116258 | 4/2003 |
| JP | 2006291842 | 10/2006 |

OTHER PUBLICATIONS

Landau, L D. and Lifshitz, E.M. "Fluid Mechanics", 2nd Ed.: vol. 6 (Course of Theoretical Physics), Pergamon Press (1987), pp. 134-135.

(Continued)

*Primary Examiner* — Joseph Waks
(74) *Attorney, Agent, or Firm* — Nadya Reingand

(57) ABSTRACT

A device and method utilizing a quasi-stationary oscillating process to generate electricity by using an interaction between a turbulent flow and an elastic oscillating structure comprising a conductor in the presence of a magnetic field, followed by rectification of thus generated electromotive force, and a combination of similar independent multiple oscillating structures into a connected grid. An arbitrary number of adjustable generating cells can be connected into a single circuit, either in-series or in-parallel, to increase an overall power output. The device operates under wide range of flow characteristics and can serve as a source of renewable power.

23 Claims, 10 Drawing Sheets

(56) References Cited

U.S. PATENT DOCUMENTS

| | | |
|---|---|---|
| 7,808,236 B1 | 10/2010 | Huang |
| 7,812,466 B2 | 10/2010 | Lu |
| 2008/0129254 A1 | 6/2008 | Frayne |
| 2008/0136562 A1* | 6/2008 | Kulah et al. .................. 333/186 |
| 2008/0278008 A1* | 11/2008 | Roberts et al. ................. 310/29 |
| 2008/0297119 A1 | 12/2008 | Frayne |
| 2009/0097981 A1 | 4/2009 | Gabrys |
| 2009/0169354 A1 | 7/2009 | Kelaiditis et al. |
| 2009/0278358 A1 | 11/2009 | Lemieux |
| 2009/0295163 A1 | 12/2009 | Frayne |
| 2009/0309362 A1 | 12/2009 | Frayne |
| 2010/0148519 A1 | 6/2010 | Shih |
| 2010/0187829 A1 | 7/2010 | Douglas |
| 2010/0207395 A1 | 8/2010 | Frayne |
| 2010/0237719 A1 | 9/2010 | Hadas |
| 2010/0237748 A1 | 9/2010 | Malkin |
| 2010/0247302 A1 | 9/2010 | Suma |
| 2010/0253150 A1 | 10/2010 | Porter |
| 2010/0260592 A1 | 10/2010 | Chen |
| 2010/0308599 A1* | 12/2010 | Pabon et al. .................. 290/1 A |

OTHER PUBLICATIONS

N. Wang and D. P. Arnold, "Fully Batch-Fabricated MEMS Magnetic Vibrational Energy Harvesters," Power MEMS 2009, Washington DC, USA, 2009.

International Search Report dated Jun. 13, 2011, PCT/US2010/052191.

* cited by examiner a.

b.

a.

b.

DEVICE AND METHOD FOR HARVESTING ENERGY FROM FLOW-INDUCED OSCILLATIONS

CROSS REFERENCE TO RELATED APPLICATIONS

This application is a continuation-in-part of a U.S. application Ser. No. 12/577,392 U.S. Pat. No. 8,258,644 issued Sep. 4, 2012 entitled "Apparatus for Harvesting Energy from Flow-Induced Oscillations and Method for the Same", filed on Oct. 12, 2009, the entire content of which is incorporated by reference herein.

FIELD OF INVENTION

This invention relates to electricity generation from oscillations of a structure in the presence of a flow of a variety of types.

BACKGROUND OF INVENTION

The present teachings are related to the conversion of kinetic energy existing in various flows, such as an airflow, a water flow, a tidal wave, etc., into electricity. The present teachings describe a novel energy converter, and its various embodiments, that efficiently utilizes oscillations induced by different types of flow, in order to generate electricity.

Mankind has been utilizing the flow energy of water or wind for centuries. The kinetic energy of a flow can be converted into rotating or oscillating movements of the affected device, where energy can further be harvested by different means.

Modern wind-powered and hydro-powered generators that are based on propellers, rotors, turbines, or rotating airfoils became reliable and widespread energy sources and their implementations are growing due to their economical power production and environmental benefits.

Large wind turbines, which are typically located off shore or in remote areas, have increasingly being installed worldwide, providing megawatts of electric power without polluting the environment. Although the turbine-based wind generators are, in general, effective in certain conditions, they have limitations resulting from typical requirements of large open spaces (consistently high-speed winds), infrastructure development requirements and large initial capital costs.

While such generators can provide sufficient energy for small applications, they are not optimized for efficient conversion of energy available in various flows of gases or fluids.

The previous designs of flow energy harvesting devices require incorporation of weights, in forms of coils or magnets, and vortex shading devices designed to move a substantial mass with some displacements at a certain frequency. This mass requires a special vibrating assembly and, in some cases, a source of instability at the oscillation onset. This limits the span of possible oscillation frequencies and/or may damp down the desired oscillation frequencies for certain flow characteristics. Moreover, in all previously proposed generators the weight of the vibrating element restricts the allowed transducer geometry, resulting in a limited range of oscillation frequencies needed for efficient energy conversion. Accordingly, previously disclosed vibration-based power generators are not optimized to utilize the available energy of various flows in a single vibrating assembly, thus limiting the energy conversion efficiency.

Vibration-based electro-mechanical converters are facing another problem associated with achieving efficient rectification of the generated alternating current (AC). Different attempts have been made to optimize the energy extraction from the generators by improving the rectifying electrical circuits.

Therefore, there is a strong need for a new type of low-cost/low-maintenance power generators that are capable of efficient conversion of the flow kinetic energy into electricity under various conditions, such as flow velocities, temperature/humidity variations, etc. New, commercially feasible, small foot-print, scalable solutions are needed to overcome the previous rationales that restrained the non-turbine electrical generators from earlier implementation.

The growing emergence of microwatt to milliwatt motional/vibrational energy harvesting technology is promoting the development of low-power power management circuits. For vibrational energy harvesters, one specific need is in ac/dc converter circuits that can operate at low input power and low voltage with acceptable efficiency (usually greater than 80%). However, so far most attention has been focused on circuits for piezoelectric harvesters, where output voltage levels are generally higher (typically greater than 1 V) than in similarly sized magnetic harvesters (typically less than 1 V). No suitable low-voltage rectification solution exists currently for an effective implementation of the harvesting systems of the present teachings. Therefore, the present teachings also contain a disclosure of a compatible rectification solution.

SUMMARY OF INVENTION

The needs set forth herein as well as further and other needs and advantages are addressed by the present embodiments, which illustrate solutions and advantages described below.

The invention disclosed herein does not require an attached mass to provide a desired oscillation of the vibrating element. It also does not require any rotating, friction, grinding parts or flexible membranes to prove a quiet, virtually maintenance-free, operation.

The new type of energy converters of the present invention can be manufactured using MEMS technology, also enabling the "generators on a chip" concept. The small generating cells, based on the present teachings, can become the building blocks for various generators of different scales, including very small generators or large energy-harvesting panels. In the future, flexible configurations that use multiple generating cells joined into customized structures of arbitrary shape, can become indispensable power supply for any micro- and macro-environments, where the natural or artificial flow is available.

One aspect of the present invention is a device for generating electrical power from a flow. The device comprises at least one elastic element for placing into a flow. The elastic element has at least one end fixed to a base. The device further comprises at least one conductor. The at least one conductor is attached to the at least one elastic element. The device even further comprises a magnetic field source configured to apply a magnetic field to the at least one conductor. The elastic element is configured to oscillate in response to the flow, causing displacements of the conductor in the magnetic field. The magnetic field induces an electromotive force in the conductor.

The flow used by the device of the present invention can be an air flow.

The conductor of the device of the present invention may comprise an active portion and a passive portion. The active portion is arranged for maximum electrical current induction therein, while the passive portion is arranged for minimum electrical current induction therein.

The elastic element of the device of the present invention may attain a quasi-stationary breezon state. The breezon state is characterized by a constant vibrating frequency, or a combination of frequencies, and slowly varying amplitude. The lifespan of the breezon state contains multiple ($10^2$-$10^3$) oscillating periods and limited by a spontaneous intermittent amplitude change.

The orientation of the elastic element of the device of the present invention with respect to the flow can be optimized to facilitate oscillations of the elastic element.

The device of the present invention can further comprising a flow-controlling element for adjusting the velocity of the flow and the direction of the flow in proximity of the elastic element.

The device of the present invention can comprise at least two of the elastic elements.

Another aspect of the present invention is an electrical power generating system. The system comprises at least two devices for generating electrical power from a flow. The devices are electrically connected. Each device of the system comprises at least one vibrating assembly for placing into the flow. The vibrating assembly comprises at least one elastic element for placing into the flow. The elastic element has at least one end fixed to a base. The vibrating assembly further comprises at least one conductor. The conductor is attached to the elastic element. The device further comprises a magnetic field source configured to apply a magnetic field to the conductor. The vibrating assembly is configured to oscillate in response to the flow causing displacements of the conductor in the magnetic field. The magnetic field induces an electromotive force in the conductor.

The conductor in each device of system of the present invention comprises an active portion and a passive portion. The active portion is configured for maximum electromotive force induction therein, while the passive portion is configured for minimum electromotive force induction therein.

The conductor of the device of the system of the present invention can be connected to an electrical scheme for processing the electromotive force. The electrical scheme can comprise an electromotive force rectifying circuit. The circuit is capable of providing a single polarity electromotive force for aggregating electromotive forces from the at least two devices of the system.

The configuration of each vibrating assembly of each device of the system of the present invention can be optimized for maximum energy conversion efficiency.

The devices of the system of the present invention can be electrically connected in-series or in-parallel. At least one component of the devices can be micro-fabricated. The devices can be combined into an array. The array can be arranged as to possess, substantially, a two-fold symmetry or a three-fold symmetry. For example, the devices in the array can be arranged in a tetragonal or a hexagonal fashion. The array can be a liner array, a two-dimensional array, or a three-dimensional array.

Yet another aspect of the present invention is a method for generating electricity. The method comprises the step of placing into a flow an elastic element having a conductor attached thereto. The elastic element has at least one end fixed to a base. The elastic element oscillates in response to the flow. The method further comprises the step of applying a magnetic field to the conductor, such that the magnetic field induces an electromotive force in the conductor. The step of applying the magnetic field may comprise placing a source of the magnetic field in proximity to the conductor.

The method may further comprise a step of inducing a quasi-stationary breezon state in the at least one elastic element.

The method of the present invention may further comprise the step of rectifying the electromotive force. Following the rectifying step, the method may further comprising the step of combining the electromotive force with another electromotive force.

Other embodiments of the system and method are described in detail below and are also part of the present teachings.

For a better understanding of the present embodiments, together with other and further aspects thereof, reference is made to the accompanying drawings and detailed description.

DETAILED DESCRIPTION OF INVENTION

Figure 1:
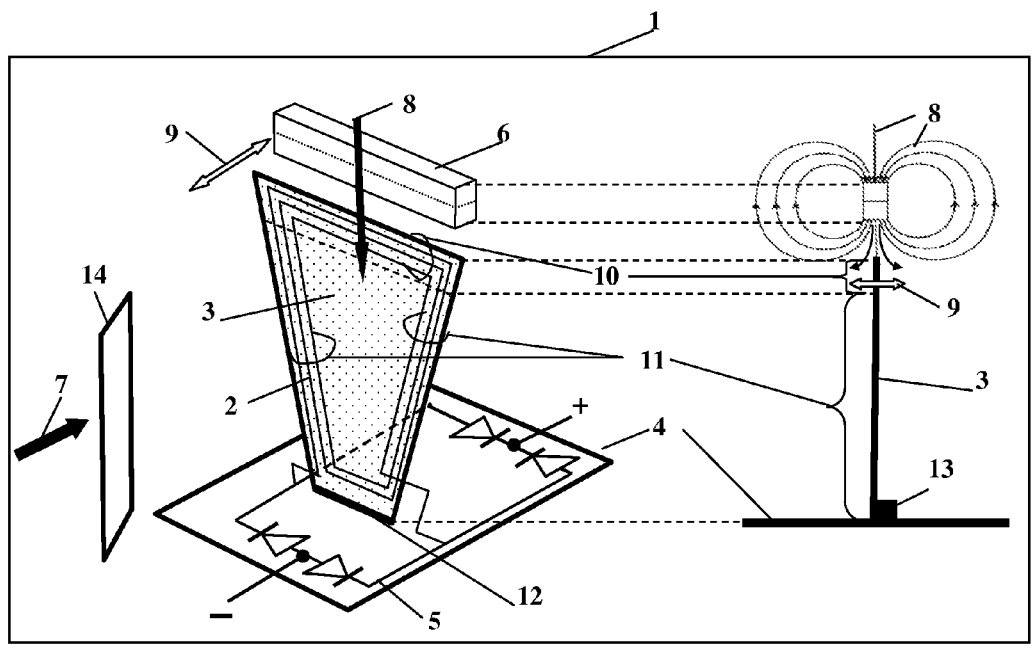
FIG. 1 illustrates an exemplary conceptual configuration of a single generating cell comprising a single vibrating assembly.
Figure 2:
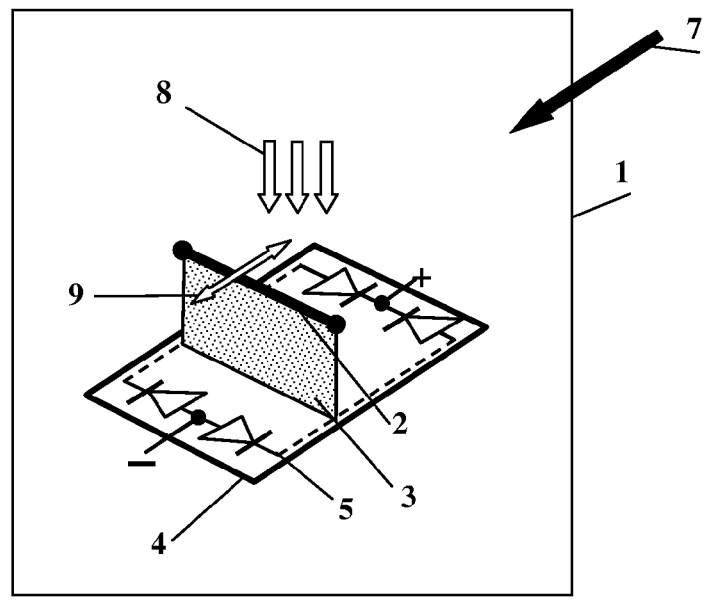
FIG. 2a illustrates an exemplary conceptual configuration of a single generating cell comprising a single vibrating assembly, where the vibrating assembly is substantially perpendicular to the flow direction.
FIG. 2b illustrates an exemplary conceptual configuration of a single generating cell comprising a single vibrating assembly, where the vibrating assembly is substantially parallel to the flow direction.
Figure 2:
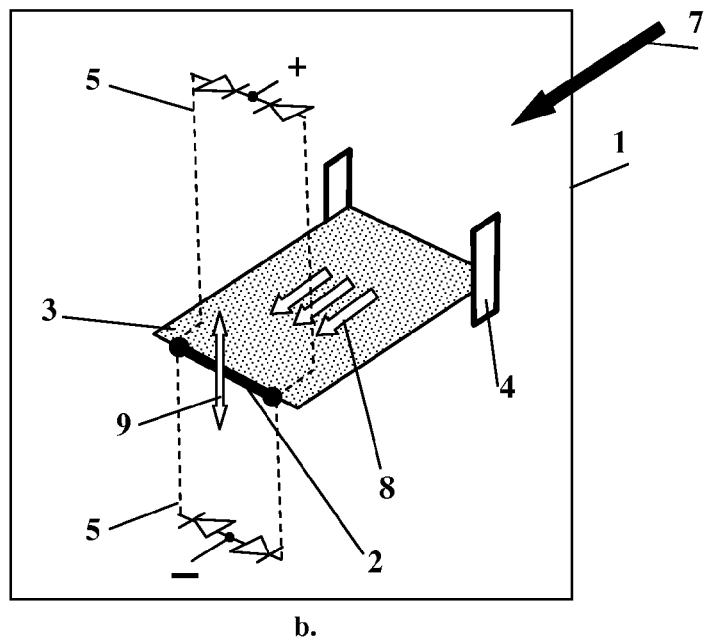

The device of the present teachings is an electrical generator which includes at least one electrical conductor, or a conductive element, and at least one magnetic field source, both placed into an external flow. The conductor is attached to an elastic element and configured to move together with the elastic element. The elastic element is attached to a base at least at one point. When the flow does not impinge on the elastic element, the elastic element and the conductor are maintained in a neutral position at the base. When the flow impinges on the elastic element, it causes a displacement of the elastic element, with the conductor attached therein, in proximity of the magnetic field, thus producing electricity in the conductor.

Embodiments of the generator of the present invention are described below, but it should be clearly understood that the principles of the invention are not limited to any particular embodiment of generator described herein. It will be apparent to one skilled in the art that the present teachings can be practiced without the specific details.

The term "flow", as used herein is defined as one or more gases (such as an air, natural gas, etc.), liquids (such as oil, water, etc.), one or more solids (such as sand, mud, etc.), or any combination thereof.

The term "elastic element", as used herein, is defined as a springy element with elastic properties, that can be made of different materials, and have different geometrical shapes and sizes. Said elastic element is made of a solid material (e.g. metal, plastic, other organic materials or combinations of above). The elastic element is designed to produce partially-induced auto-oscillations in the flow of a gas or a liquid, and its characteristics are optimized in terms of response to the applied force of the external flow. The elastic element is integrated with the conductor.

The term "conductor", as used herein is defined as an electrical conductor that can be implemented either as a single piece or as a combination of multiple conductors, have various shapes, such as spirals, coils, spools, reels, etc., be made of various electrical conducting materials of various geometries. The conductor is attached to the elastic element, preferably rigidly.

The term "magnetic field source", as used herein, is defined as a permanent magnet or an electrical magnet (solenoid), made of a single or multiple elements (magnets), and/or a single coil or a plurality of coils, of the same or different shapes, materials or sizes.

The term "base", as used herein, is defined as any structure that has sufficient strength to support at least one affixed elastic element. The supporting structure can be made of any material, having various shapes and sizes. The base can also support a magnetic field source.

The term "vibration mode", as used herein, is defined as a normal (or resonant) mode of the vibrating assembly. The frequencies of the normal modes of the assembly are defined as its natural (intrinsic, or resonant) frequencies. A normal mode of the vibrating assembly is a pattern of its motion. Any vibrating assembly has a set of normal modes (and corresponding frequencies) that depend on its structure and composition. The most general vibrating motion of the assembly is a superposition of its normal modes, where each of the modes is a single frequency solution of the motion equations. The modes are normal in the sense that they can move independently, and an excitation of any single mode does not affect the motion of another mode.

The conductor together with the elastic element defines the "vibrating assembly" of the generator. The vibrating assembly is attached to the base. By choosing appropriate materials and geometries of the vibrating assembly, the vibration modes of the assembly can be optimized resulting in a higher conversion efficiency of the disclosed generating cell.

The term "breezon", as used herein, is defined as an exited state of the vibrating assembly (e.g. an elastic plate with attached conductor), which is characterized by a constant vibrating frequency, or a combination of frequencies, and slowly varying amplitude. The lifespan of the breezon contains multiple ($10^2$-$10^3$) oscillating periods and is limited by a spontaneous intermittent amplitude change.

A combination of the vibrating assembly and the magnetic field created by the magnetic field source defines a unit which forms a "generating cell" of the transducer (i.e. generator or "harvester"). A single generating cell includes one or more vibrating assemblies and one or more magnetic field sources.

While such terms as conductor, elastic element and magnetic field source are used separately in the forthcoming disclosure, it should be clearly understood that these three elements form a part of a single unit and are, preferably, integrated together.

An embodiment of the generating cell of the present teachings, having a single vibrating assembly, is described below with reference to FIG. 1. Generating cell 1 comprises elastic element 3 which supports conductor 2; these two elements (3 and 2) define the vibrating assembly of the cell. Elastic element 3 is connected to base (i.e. supporting structure) 4 at least by a single end 12.

Figure 3:
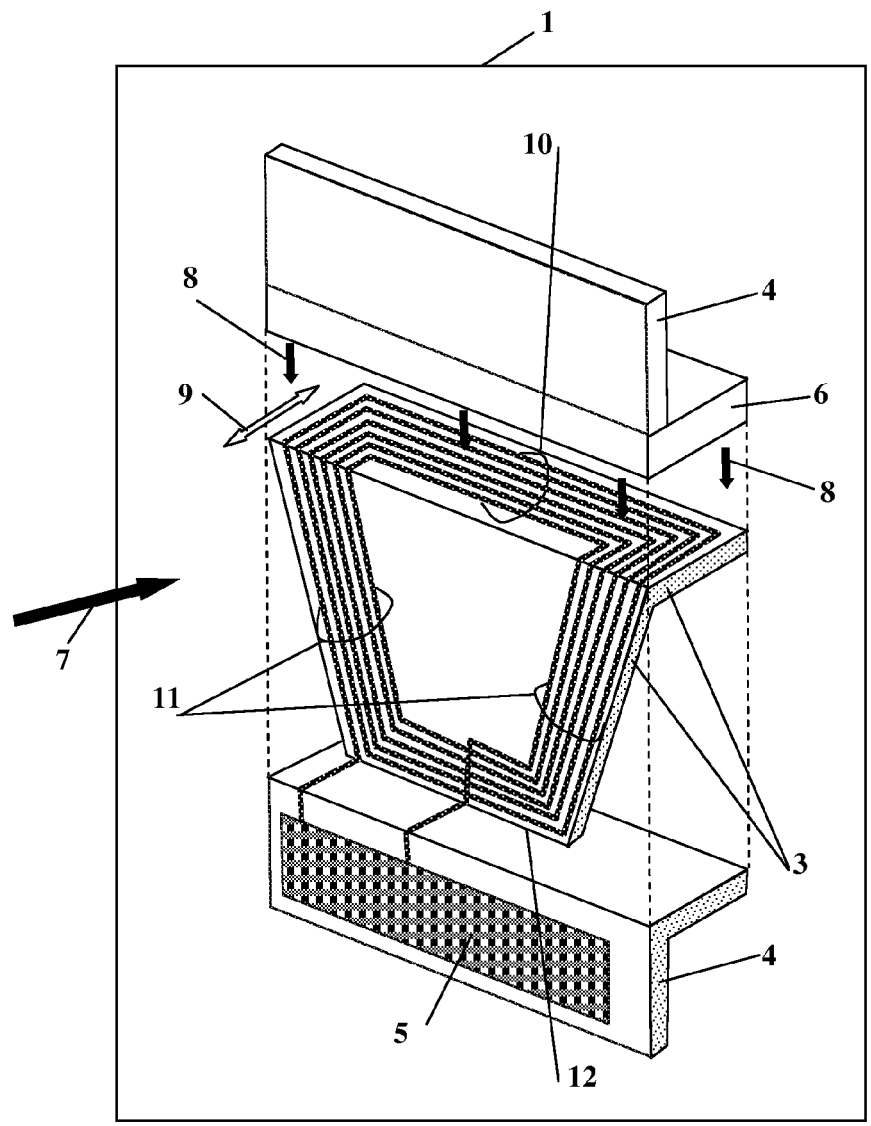
FIG. 3 shows a conceptual view of the fully micro-fabricated generating cell comprising a single vibrating assembly, where the direction of an electrical current in the 'active' portion of the conductor is substantially perpendicular to the magnetic field lines of force, while the direction of the electrical current in the conductor's 'passive' portion is substantially parallel to the lines of the magnetic field.

With continued reference to FIG. 1 and with reference to FIG. 3, conductor 2 comprises active portion 10 and passive portion 11. Conductor's active portion 10 is arranged in such a manner within the vibrating assembly that magnetic field lines 8 produced by magnetic field source 6 are maximized in the vicinity of the conductor active portion 10. Moreover, conductor's active portion 10 is arranged in such a manner within the vibrating assembly that the total cumulative length of conductor's active portion 10 in the vicinity of magnetic field source 6 is maximized. Elastic element 3 is connected to base 4 at edge 12.

The direction of an electrical current in active portion 10 is substantially perpendicular to the magnetic field lines 8 produced by magnetic field source 6, while the direction of the electrical current in conductor's passive portion 11 is substantially parallel to magnetic field lines 8.

With continued reference to FIG. 1 and FIG. 3, when conductor 2 moves (oscillates) in the presence of magnetic field 8, the electromotive force is generated mostly in active portion 10 of conductor 2, whereas the contribution of conductor's passive portion 11 to the generated conductive force is substantially smaller.

Generally, the configuration of the vibrating assembly is optimized for converting the flow energy into the vibrating energy by exploiting a vortices shedding effect and/or a flutter effect induced along the elastic element of the assembly.

Principle of Operation of the Generating Cell

With continued reference to FIG. 1, and with reference to FIG. 2, FIG. 3, FIG. 9 and FIG. 10, the operation of generating cell 1 can be summarized as follows.

Flow 7 initiates a self-exciting (spontaneous) instability in the vibrating assembly involving a combination of vortices shedding and, in some cases, elastic flutter. This self-excitation is enhanced by a positive feedback loop of continuous flow deflection by the vibrating assembly as well as elastic force that depend on deformations of elastic element 3.

Self-excitations of the elastic element, combined with rigidly affixed conductor (preferably integrated with the elastic element), are enhanced by a positive feedback loop until an approximately constant oscillation state of the elastic element with the affixed conductor is achieved. The amplitude of such oscillations depends on attenuation within the elastic element.

Flow 7 can be of any type, such as liquid or gas, for example an airflow in the natural wind or artificial ventilation systems. The flow travels across elastic element 3. Generally, flow may come from either side of the generating cell.

Flow 7 causes initiation of vibration of the vibrating assembly in direction 9. The vibration (oscillation) of the vibrating assembly caused by flow 7 results in displacements of conductor 2 relative to applied magnetic field 8 created by magnetic field source 6. Such displacements induce an electrical current propagating within conductor 2. The oscillation takes place along direction 9 and across transversal magnetic field 8, thus inducing an alternating potential at the ends of conductor 2.

When flow 7 does not impinge on the vibrating assembly, the vibrating assembly is maintained in a neutral position by the elastic force of elastic element 3. Elastic element 3 is biased toward its neutral position when flow forces 7 displace elastic element 3, which comprises affixed conductor 2, away from its neutral position.

Electrical circuit 5 is provided to properly extract the current generated in conductor 2. It should be clearly understood that the electrical circuit is shown schematically for illustrative purposes only. Various suitable low-power electrical schemes can be implemented as electrical circuit 5, as will be addressed below.

Magnetic field 8 is generated by at least one magnetic field source 6. Magnetic field source 6 can be either a permanent magnet or an electrical solenoid. The flow perturbation is applied to elastic element 3 and is a function of the characteristics of flow 7 and physical characteristics of elastic element 3, such as elastic properties, geometry, size, etc.

The angle between flow 7 and the vibrating assembly is chosen to maximize the values of the vibration parameters for a given vibrating assembly, e.g. maximum linear velocity of the vibration of the conductor's active portion 10 (see FIG. 1 and FIG. 3). Generally, elastic element 3 may be positioned at an angle relatively to flow 7. Generally, the orientation of the elastic element is optimized for maximum energy conversion efficiently. For example, the value of the angle between the elastic element and the flow direction is conditioned by the maximum conversion efficiency.

The flow vortices impinge on the vibrating assembly, particularly on elastic element 3, at frequencies that depend, substantially, on the flow characteristics. In general, the higher the flow velocity, the higher the frequencies of the vortices are. Preferably, the set of frequencies of the vibration modes of the vibrating assembly has to be substantially equal to the possible frequencies of the vortices in the flow, so that the lift forces produced by the vortices enhance the amplitude of the vibrating assembly displacements, thus increasing the generating cell efficiency.

To illustrate different angular arrangements between the elastic element and the flow direction, two distinct aspects of the cell of the present teachings are shown schematically in FIG. 2a and FIG. 2b. FIG. 2a illustrates an exemplary arrangement when elastic element 3 is substantially perpendicular to flow direction 7, while FIG. 2b illustrates an exemplary arrangement when the elastic element it substantially parallel to flow direction 7. In both cases, the arrangement of magnetic field source 6 provides magnetic field 8 which is substantially perpendicular to conductor 2. Shown, or similar, configurations are optimized for converting the flow energy into vibration energy by exploiting a vortices shedding effect and/or a flutter effect induced along the elastic element.

The configuration of the vibrating assembly, or combinations thereof, can vary significantly depending on a particular application. Shapes and materials of the vibrating assembly are determined by the maximum conversion efficiency for a particular application. The materials may include metal, plastic, other organic materials or combinations of above. The variations may include materials with different elastic properties and shapes, including tapered, elongated shapes, as well as shapes that may incorporate holes, and/or protrusions and/or depressions to enhance the oscillation characteristics, while fitting within the available space to allow for sufficient vibrating movements, accommodating nearby magnetic field sources, etc.

As described in the foregoing disclosure, conductor 2 is positioned substantially perpendicular to magnetic field orientation 8. It should be noted that various arrangements are possible between magnetic field source 6 to provide for appropriately oriented magnetic field lines 8 with respect to conductor 2, for example as illustrated FIG. 1. At least one conductor 2 within cell 1 can be made of metal rods, loops or coils attached to or deposited on elastic element 3, and configured to move with elastic element 3. Also, multiple such elements can be integrated into a single vibrating assembly.

Generally, an arbitrary number of conductors 2 can be included into a single cell 1. The conductors are arranged in proximity to corresponding magnetic field sources. Various arrangements of conductors 2 can be attached to elastic elements 3 proximally to magnetic field sources 6.

It should be clearly understood that any type of a magnet (permanent magnet, electromagnet, combinations of magnets and ferromagnetic material etc.), any number of magnets, and any configurations of magnets may be used in the systems described herein, in keeping with the principles of the invention.

Generally, the shape of elastic element 3 is not limited to one shown in FIG. 1. Without departing from the principles of the invention, the vibrating assembly may include non-uniform (e.g., a tapered) shapes or structures with non-uniform thickness. For example, the thickness of elastic element 3 can change progressively toward either of its ends, providing more effective strain energy utilization.

Micro-Fabrication of the Generating Cell

Generally, it is highly desirable to employ fully integrated, fully-batch-micro-fabricated electromagnetic generating cells to enable large-scale manufacturing of numerous transducers at low cost. Additionally, micro-fabricated transducers offer the potential for co-fabrication with CMOS or other semiconductor circuits for system-on-chip solutions.

To create a 3-dimensional configuration for a combination of generating cells, a surface micromachining or bulk micromachining can be used. A surface micromachining is based on a thin-film patterning on a top of a substrate wafer. Unlike surface micromachining, the bulk micromachining defines structures by selective etching of the substrate.

Advantages of micro-fabrication include increasing the conductor coil turns within vibrating assembly, closer positioning of the conductor relatively to the magnetic field source, using lighter vibrating assemblies, optimizing the center proof mass, implementing stronger, custom-shaped magnets and integration with a control circuitry.

Several lithographic methods have been developed in recent years including micro contact printing (mCP) and nano-imprint lithography (NIL). In the case of micro contact printing an elastomeric stamp is used to directly print self assembly electromagnetic coil mono-layers (SAMs) on a variety of different substrates. The monolayer can be used as a mask to pattern the underlying films, such as conductors having a coil configuration.

In the case of nano-imprint lithography an entirely flat mold is pressed simultaneously into a polymer cast on a flat substrate. The molded polymer can be used as a mask to pattern the substrate. Both methods provide a relatively inexpensive route of patterning structures on macro-scale areas with resolutions down to the sub-100 nm range.

Alternatively, the micro-molding process can be used for the fabrication of micro-coils on rigid substrates like silicon, glass, $LaAlO_3$ and sapphire. It is compatible with standard integrated circuit (IC) technologies and can be performed by a batch-process. Some variations of the micro-molding process have being carried out for the realization of coils on flexible substrates including Kapton® substrates.

Moreover, the electroforming fabrication technology can be implemented for the fabrication of micro-coils.

Most of the reported micro-scale electromagnetic energy harvesters use MEMS fabrication technology for only a portion of the device. For example, micromachining may be used to create electrostatic switches or coils, with the rest of the device still manually assembled. In particular, since there is a challenge for integration of permanent magnetic materials into MEMS processing, most methods for fabrication of micro-magnets with good magnetic performance are not fully compatible with conventional MEMS processing. For example, the best magnetic materials, rare-earth magnets, cannot be electroplated via aqueous solutions, and physically deposited (sputtered, pulsed laser deposited). Rare-earth films require high temperature processing to realize good magnetic performance. This temperature range is too high for other conventional MEMS materials, such as polymers and some metals, to survive the processing.

It is also desirable to also use integrated magnet technology to fabricate fully integrated, fully-batch-micro-fabricated electromagnetic generating cells. Recently a wax-bonded micro-magnet fabrication process was reported (see, for examples, Fully Batch-Fabricated MEMS Magnetic Vibrational Energy Harvesters, N. Wang and D. P. Arnold, Power MEMS 2009, Washington D.C., USA, 2009, the entire content of which is incorporated herein by reference) that shows the potential for full permanent magnet source integration into MEMS process flows.

As an example of micro-magnet integration technology, DRIE can be used from the backside to define cavities for the magnets with sub-millimeter resolution. For example, a rare earth NbFeB magnetic powder is used in fabrication of micro-magnets. The magnetic powder can be mixed homogeneously with wax powder and dry-packed at room temperature into pre-etched cavities with compression. The vibrating assembly can be deep-etched to form the same wafer. Individual assemblies with integrated magnets can be further diced from the processed wafer.

A conceptual view of an example of a fully micro-fabricated generating cell is shown in FIG. 3. It should be clearly understood that various lithographic, micro-molding and alternative micro-fabricated techniques and manufacturing methods for the realization of the generating cell, such as one shown schematically in FIG. 3 or similar, can be implemented without departing from the principles of the present teachings. Moreover, various embodiments of the generating cell described herein may be realized using MEMS technology in various component orientations, such as inclined, inverted, horizontal, vertical, etc., and in various configurations, without departing from the principles of the present teachings.

Energy Distribution within Generating Cell

Figure 4:
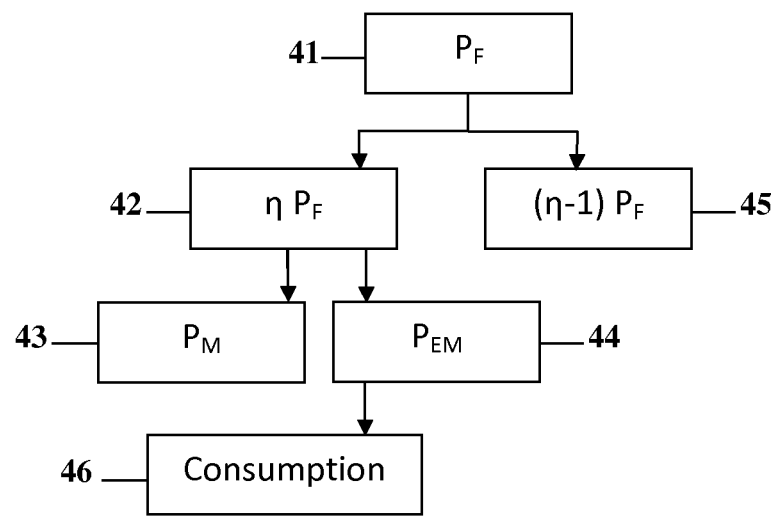
FIG. 4 illustrates energy supply within a single cell.

FIG. 4 shows a diagram of the energy supply in the harvesting system of the present teachings for a single transducer case. Flow energy 41 ($P_F$) to transducer output 46 depends mainly on the flow velocity and the area captured by the cell. A portion of the energy that is captured by the cell is defined by the coefficient η in 42 and 45, and depends on the parameters of the cell (e.g. shape, size, and material characteristics of the elastic element) and, to a lesser degree, the oscillation amplitude of the elastic element, including the active portion of the attached conductor.

Power 43 ($P_M$) is required to overcome internal frictions within the elastic element, and depends on the oscillation amplitude. The oscillation amplitude, in turn, is defined by the elastic element material characteristics (e.g. mass, elasticity, resilience), and its shape. Useful capacity (i.e. effective output) 44 of the harvesting system, a single transducer case, of the present teachings is designated as $P_{EM}$.

Preferentially, the set of resonant frequencies of the vibrating assembly should be substantially equal to the vortex frequencies within the predetermined range of flow velocities, thus providing a more efficient capture of the flow energy by the vibrating assembly.

EXAMPLE

Exemplary experimental characteristics of the configuration of the generating cell of the present teachings for flow velocities between about 2 m/c and about 10 m/c are as follows.

The size of the elongated thin elastic plate is between about 30 mm and about 80 mm in length, and is about 5 mm in width; the mass of the elastic plate is about $10^{-3}$ kg; the frequency of the fundamental vibration mode is between about 20 Hz and about 150 Hz; the vibration amplitude is between about 0.5 mm and about 2 mm.

The experiments were conducted in such a way that the characteristic frequencies of the turbulent flow in the experimental setup were substantially equal, within an order of magnitude or less, to the fundamental vibration mode frequencies (or a combination thereof) of the vibrating assembly. This condition is preferred for the maximum flow energy capture efficiency.

Figure 5:
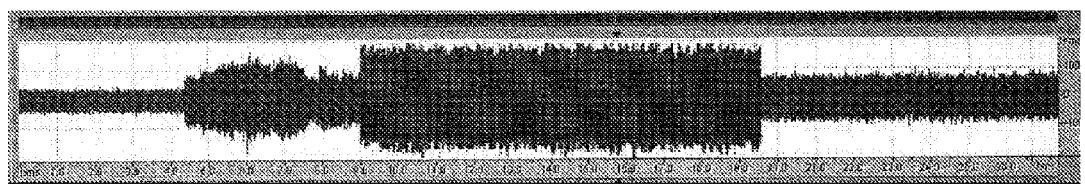
FIG. 5a is a schematic representation of the disclosed oscillation process with the external force F(t), and the corresponding vibrating assembly deviation from the equilibrium state x(t)
FIG. 5b illustrates the experimentally observed oscillation amplitude over time.
Figure 5:
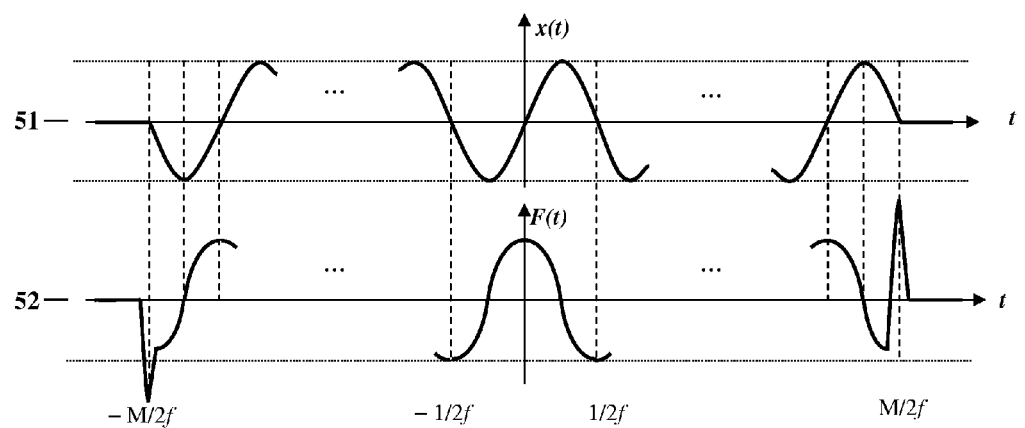

FIG. 5a illustrates the time dependence of the oscillation amplitude of the experimental device comprising a single vibrating assembly. Four different oscillation states (four 'breezons') with stochastic amplitudes are shown. As is apparent from FIG. 5a, the oscillation of the vibrating assembly induced by the turbulent flow display a quasi-stationary behavior. The lifetime of the exited oscillating state (i.e. breezon) is a stochastic parameter which includes multiple (around $10^2$-$10^3$) oscillating periods of the vibrating assembly.

The frequency of such a quasi-stationary breezon equals to the vibration mode frequency (or a combination thereof) of the vibrating assembly. The breezon amplitude is also a stochastic parameter which depends on environmental macro-fluctuations.

Air-Flow and Vibrating Assembly Interaction Model

For an approximate description of the interactions between air-flow and the vibrating assembly the following expression can be used:

$$m\frac{d^2 x}{dt^2} + (\sigma_M + \sigma_E)\frac{dx}{dt} + kx = F(t), \quad (1)$$

where x is the deviation of the center of the assembly from an equilibrium state, m is the assembly characteristic (averaged) mass, k is the average spring (stiffness) constant, $\sigma_M$ is the attenuation coefficient due to the internal dynamic friction of the elastic element, $\sigma_E$ is the attenuation coefficient due to the current induced in the (attached) conductor (i.e. electromagnetic damping), and F(t) is the force of the flow impinging on the vibrating assembly.

For a more accurate analysis, equation (1) should include the variation of the geometrical shape along the vibrating assembly, as well as variation of mass, attenuation coefficient ($\sigma_E$ in particular), as well as the spring constant along the vibrating assembly coordinates. However, equation (1) is adequate for a qualitative analysis of the structure.

Without external flow, i.e. when F(t)=0, the decaying solution for equation (1) can be defined as:

$$x(t) \sim \exp\left(\frac{-(\sigma_M + \sigma_E)t}{2m}\right)\sin(2\pi ft); \quad f = \frac{1}{2\pi}\sqrt{\frac{k}{m}} \qquad (2)$$

The force of the stationary turbulent flow applied to the vibrating assembly (see F(t) in equation (1)) substantially differs from zero. The experimental data obtained for x(t) enables calculation of such force by applying an inverse problem solution to equation (1). Accordingly, the (experimental) deviation from the equilibrium state can be represented in the following form for a single breezon:

$$x(t) = \begin{cases} 0 & \tau < -\tau/2 \\ A\sin(2\pi ft); & -\tau/2 < \tau < \tau/2 \\ 0 & \tau > \tau/2, \end{cases} \qquad (3)$$

here A and f are the vibrating assembly oscillation amplitude and fundamental mode, respectively, and τ is the breezon lifetime:

$$\tau = \frac{M}{f}, \qquad (4)$$

where M is the number of oscillation periods that fall into the breezon lifetime that can be considered an integer number for simplicity. Such oscillation process is shown schematically in FIG. 5b, where the vibrating assembly deviation from equilibrium state 51 (x(t)) and external force 52 (F(t)) are shown.

After applying direct and inverse Fourier transforms for equation (1) along the full dimension, the external force F(t) can be represented as follows (see FIG. 5b, graph 52):

$$F(t) = \begin{cases} 0 & \tau < -\tau/2 \\ Am2\pi f(-1)^M [\delta(t+\tau/2) - \delta(t-\tau/2)] + & \\ A(\sigma_M + \sigma_E)2\pi f \cos(2\pi ft); & -\tau/2 \le \tau \le \tau/2 \\ 0 & \tau > \tau/2 \end{cases} \qquad (5)$$

Initiating and stopping of the assembly oscillation are described by two respective δ-functions in equation (5).

The impulse gained by the vibrating assembly at the beginning and at the end of such oscillation process equals to:

$$\epsilon = 2\pi Amf \qquad (6)$$

For efficient device operation, the amount of power spent on breezon excitation should be substantially smaller than the amount of power needed to overcome the damping forces. This is true for a breezon of a long lifetime, that is for a breezon having a large energy to lifetime ratio.

The power required for overcoming the damping forces (internal frictions and electromagnetic resistance, as illustrated in FIG. 4) during oscillations can be represented as follows:

$$\eta P_F = \frac{1}{T} \int_0^T dt F(t) \frac{dx}{dt} = 2\pi^2 A^2 f^2 (\sigma_M + \sigma_E) \qquad (7)$$

where T is the oscillation period, x(t) and F(t) are defined in (3) and (5), respectively. Then the oscillation amplitude can be defined as:

$$A = \frac{1}{2\pi f}\sqrt{\frac{2\eta P_F}{(\sigma_M + \sigma_E)}} \qquad (8)$$

The coefficient η in (8) represents the portion of the energy that is captured by the cell, which also depends on the oscillation amplitude. Such dependence can be determined experimentally.

The efficiency of the generating cell is defined by the power that is required to overcome the electromagnetic damping force, which, according to the Lorenz law, is given by:

$$F_D = \int_0^L \overline{B} \times \overline{I} \, dl, \qquad (9)$$

where $\overline{B}$ is an inductance of the magnetic field, and integration is taken over the full length of the conductor (indicated with the numeral 2, see FIG. 1 and FIG. 3).

The calculations for the generating cell of the present teachings provide the following result for electromagnetic resistance (attenuation coefficient) $\sigma_E$ (see equation (1)):

$$\sigma_E = \frac{B^2 L_A^2}{r+R}, \qquad (10)$$

where r and R are the resistances of the conductor and transducer electrical load, respectively; B is an average inductance of the magnetic field the active portion of the conductor and $L_A$ is the length of this active portion of the conductor (indicated with the numeral 10 in FIG. 1 and FIG. 3).

With reference to FIG. 4, the useful capacity (i.e. effective output) of the transducer $P_{EM}$ is defined through the total energy of the flow $P_F$:

$$P_{EM} = 2\pi^2 A^2 f^2 \sigma_E = P_F \frac{\sigma_E \eta}{\sigma_M + \sigma_E}, \qquad (11)$$

It is apparent from equation (11) that efficiency of a single transducer is mainly determined by the coefficient η. The overall power of the flow is given by:

$$P_F = \frac{\gamma S V_F^3}{2}, \qquad (12)$$

where γ is the flow (e.g. air) density, S is the flow cross-section area and $V_F$ is the flow velocity.

Evaluation of the Generating Cell Power Output

A practical example of the generating cell of the present teachings includes a conductor (coil) comprised of N windings integrated with a vibrating assembly. The conductor includes an active (generating) portion, which is affected by the magnetic field, and a passive portion that is not participating in the generation process, yet still is required for the current management. The total length of the coil is give as:

$$L_T = N(L_A + L_P) \quad (13)$$

where $L_A$ and $L_P$ are the lengths of the active and passive portions of the conductor (coil), respectively (indicated with numerals 10 and 11 in FIG. 1 and FIG. 3). The total coil resistance (the internal source resistance), is $$r = \rho L_T / S_W \sim 3.5\Omega \quad (14)$$

Taking, as an implementation example, $L_A=20$ mm, $L_P=60$ mm, N=100, coil wire cross-section $S_W=0.04$ mm$^2$, and copper resistivity $\rho=1.68^{-8}$ $\Omega$m, the total coil resistance can be evaluated.

Thus, the maximum generated electromotive force is defined as:

$$E = BL_A N v \quad (15)$$

where v is the maximum velocity of the vibrating assembly during operation:

$$v = 2\pi A f \quad (16)$$

By measuring A=1 mm, f=100 Hz, (v~0.6 m/c) and B=1 T, it can be calculated that the generated electromotive force E=1.2V.

If the electrical load R equals the internal source resistance r, the generated current and voltage can be evaluated as: I=E/(R+r)=1.2/(3.5+3.5)=0.17 A, U=I R=0.6V.

Thus the useful capacity of a single assembly in a cell can be estimated as (equation (12), and numeral 44 in FIG. 4): $P_{EM}$=UI=0.6×0.17~0.1 W.

Power Extraction from the Generating Cell

With reference to FIG. 1, FIG. 2, FIG. 3, and FIG. 9, electrical circuit 5 is provided to process the electrical current generated within conductor 2. The resulting stochastic alternating electromotive force E from a single (independent) vibrating assembly have to be extracted and aggregated with outputs from other assemblies, thus enabling interconnection of independent cells into a grid.

The efficient aggregation of outputs from different assemblies and cells is possible only when all such contributing electromotive forces are rectified. Thus, the electromotive force generated by each assembly has to be converted into a pulsatory voltage of the same polarity (i.e. full-wave rectified). The generated voltage at the output of conductor 2, before and after rectification, are shown schematically in FIG. 6*a* with numerals 61 and 62, respectively.

Figure 7:
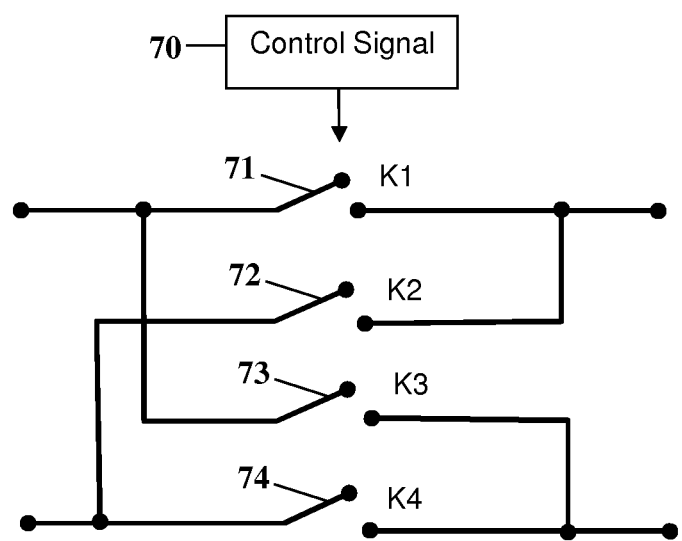
FIG. 7 illustrated a switching configuration used to commutate the generated electromotive force.

The rectification of the generated electromotive force E (equation 15) can be realized by different means. One possibility is using a switching configuration shown schematically in FIG. 7 for commuting E. Such switching configuration can either change the polarity of the generated voltage or leave it without change, depending on the received Control Signal, represented with numeral 70 in FIG. 7.

When contacts K1 and K4 (represented with numerals 71 and 72 in FIG. 7) are closed, the input/output polarities are the same. When contacts K2 and K3 (represented with numerals 73 and 74 in FIG. 7) are closed the input/output polarities change to opposite. It is important that such switching occurs when the value of electromotive force E (equation 15) passes through its zero value (so called "cold switching"). The cold switching significantly improves the switch (or relay) operation characteristics.

Figure 6:
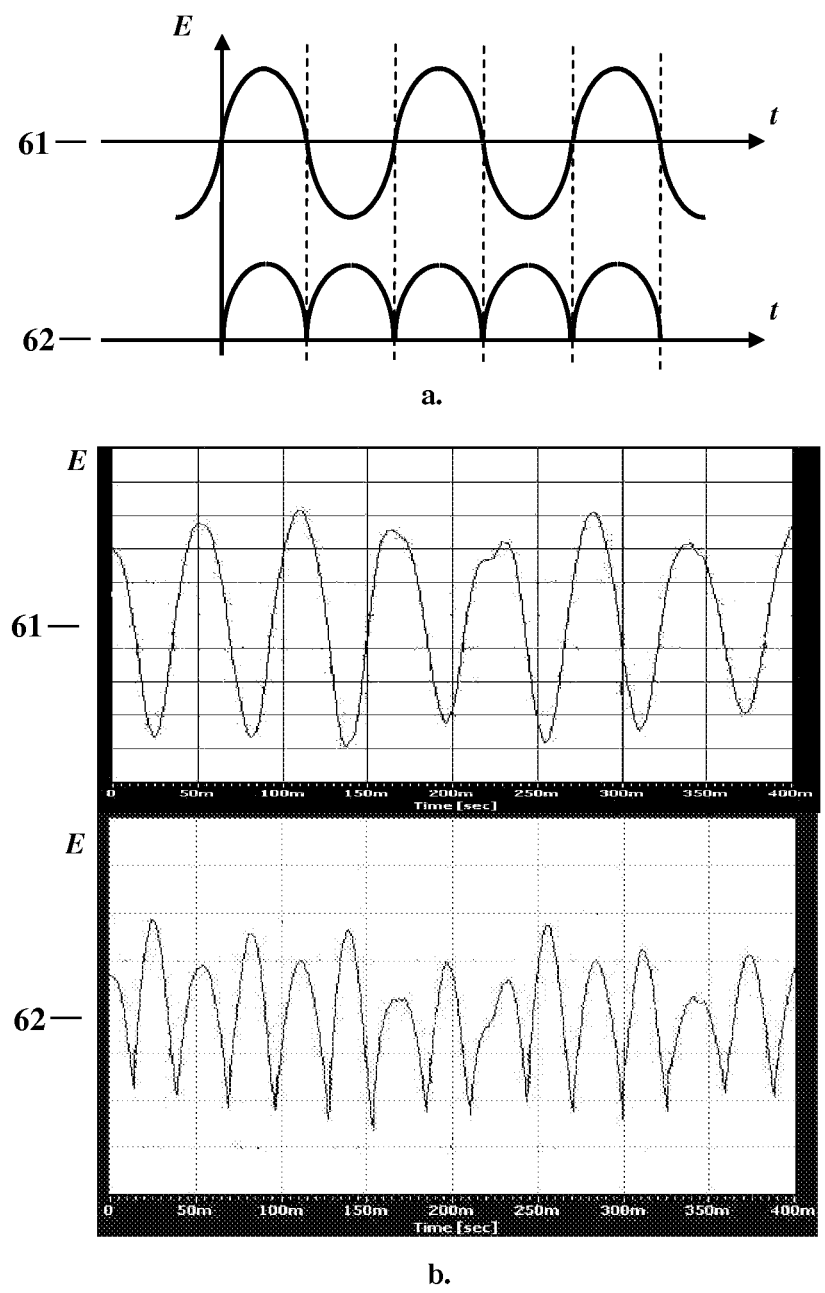
FIG. 6a shows a schematic diagram of the generated output voltage before and after rectification.
FIG. 6b shows experimental output voltage rectification on a working device prototype.

Commercial off-the-shelf switching relays were used as an implementation example. A small portion of the generated electromotive force E (equation 15) was used as Control Signal 70 in FIG. 7. The power of the Control Signal is much smaller than total value of E. FIG. 6*b* shows the experimental generated output 61 and rectified output 62, using switching configuration shown schematically in FIG. 7.

There are few alternative options for the Control Signal realization. For example, additional conductor(s) (e.g. coils) can be attached to the elastic element. A signal from the additional conductor is similar to the generated E in phase, but has smaller amplitude, and can serve as Control Signal for the switching configuration shown schematically in FIG. 7.

Alternatively, a micro piezo-element can be used for providing Control Signal. For this purpose the piezo-element should be attached to the elastic element closer to the base, to avoid unwanted perturbations of the vibration mode(s) of the assembly (see FIG. 1, numeral 13). It should be noted, however, that in this case the phase of such Control Signal is quarter-period shifted off the electromotive force phase, since the deformation of the assembly is minimal at the neutral (equilibrium) state (with zero Control Signal from piezo-element), while the velocity of the assembly, and resulting E, are maximal at that instance.

It should be clearly understood that the described electrical circuitry is given for illustrative purposes only. Various suitable low-power power converter circuits can be used as electrical circuit 5 (see FIG. 1, FIG. 2, FIG. 3, FIG. 9 and FIG. 10).

Figure 8:
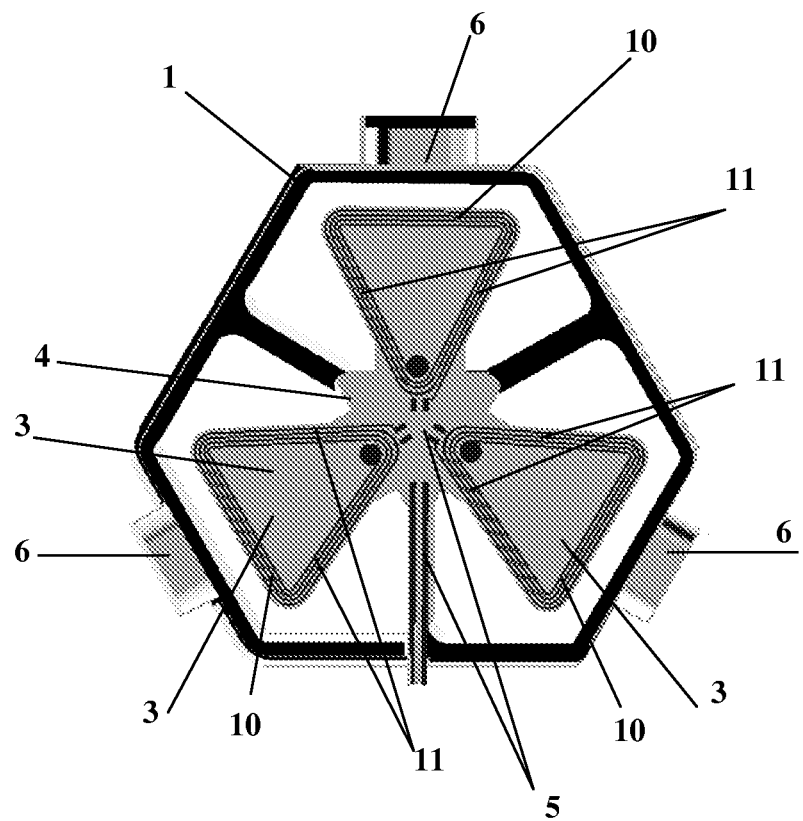
FIG. 8 illustrates a fully integrated generating cell comprising three vibrating assemblies.

In one aspect of the invention, a single cell can comprise more than one vibrating assembly. Such cell can provide higher per-cell conversion efficiency due to compact design, and partially shared mechanical base and circuitry. FIG. 8 illustrates an example of a fully integrated generating cell (transducer) with three integrated vibrating assemblies. The direction of the oscillations of the vibrating assemblies is perpendicular to the plane of the figure.

In another aspect of the invention, multiple cells can be combined together in an array of stackable generating cells (transducers). The electronic circuit can be connected in-series and/or in-parallel, to increase the total array power output.

Figure 9:
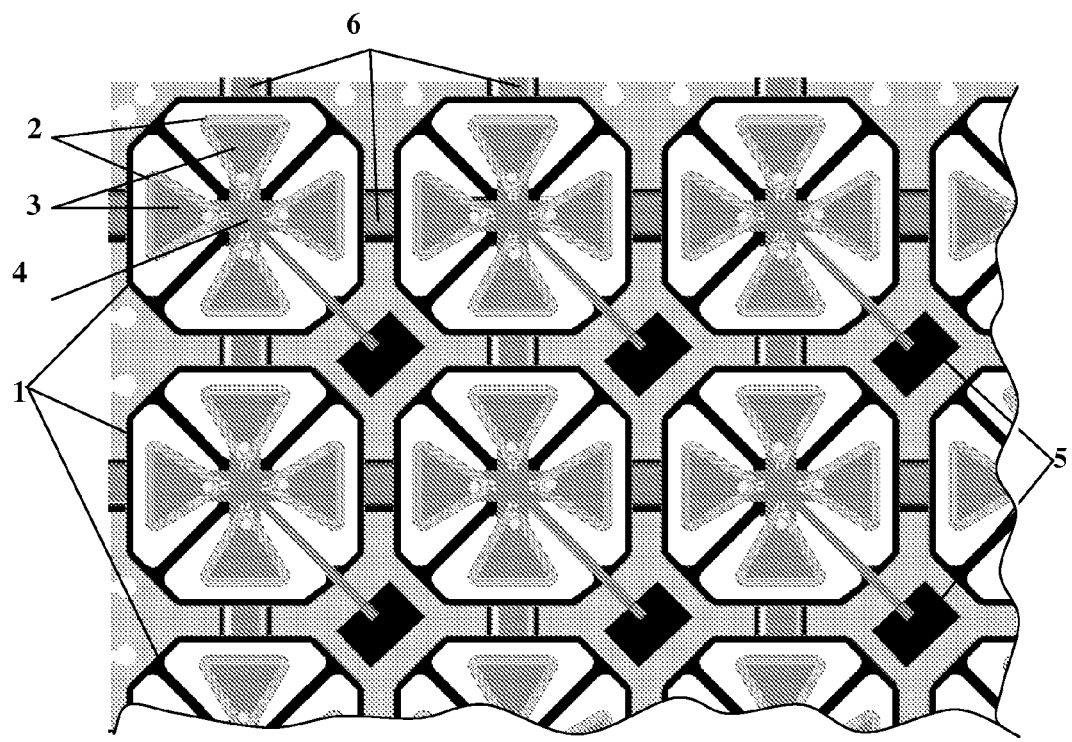
FIG. 9 illustrates an array of stackable fully integrated generating cells; each comprising four vibrating assemblies.
Figure 10:
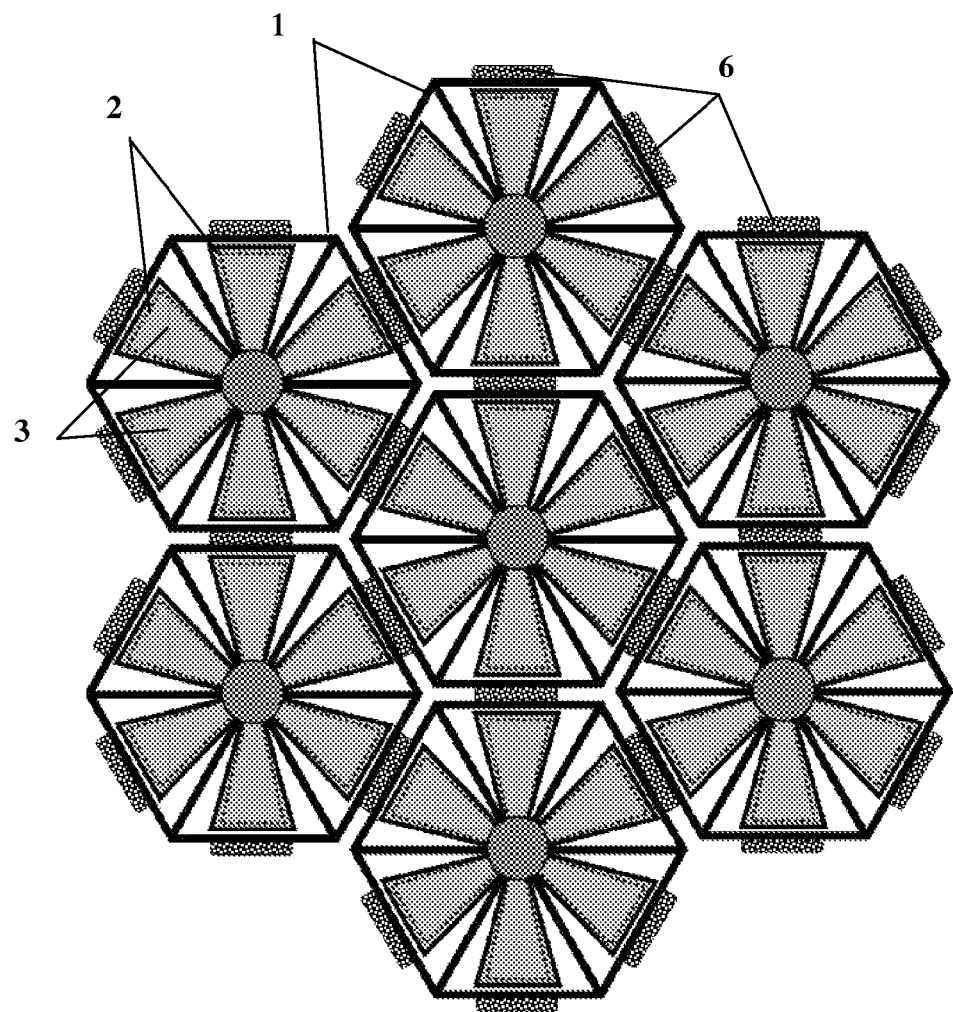
FIG. 10 illustrates an array of stackable fully integrated generating cells in a "honeycomb" configuration.

FIG. 9 illustrates an example of such an array comprising multiple cells. In turn, each cell within the array comprises four vibrating assemblies. Alternatively, FIG. 10 illustrates another example of an array comprising multiple cells arranged in a "honeycomb" configuration. Each cell within such array comprises six vibrating assemblies.

The connection type and the number of joined cells depend on electrical requirements (application), as well as on the amount of power allocated for feeding back into the generating circuit. A circuit that implements a series connection can be used, for example, to achieve higher voltages under lower flow velocities.

The array can be arranged as to possess, substantially, a two-fold symmetry or a three-fold symmetry. For example, FIG. 9 and FIG. 10 illustrate arrays of multiple stackable cells that can be arranged in a tetragonal or a hexagonal fashion, respectively. The array can be a liner array, a two-dimensional array, or a three-dimensional array.

Such arrays can serve as scalable generating panels (a 'wind-panel', for example) with adjustable cross-section areas to harvest maximum energy from available flow. The resulting power-scale of the generator depends on the total number and individual characteristics of the generating cells in the combination.

In one aspect of the device of the present invention, the device includes flow-controlling elements, as schematically shown by 14 in the FIG. 1, to adjust the flow velocity and its direction in proximity of the vibrating assembly. In another aspect, the vibration assembly itself or the flow-controlling elements are adjustable to provide maximum conversion efficiency under different flow characteristics, environmental conditions or a desired electrical output.

The device of the present teachings can also be used to generate electricity from flow-energy harvesting within confined flow passages in water-pipes, oil-pipes or HVAC ducts, for example. It can provide a power supply to various wireless sensors, distributed sensor arrays, or LED-based lighting fixtures. Generated electricity can also be used for powering cell phones, as well as remote telecommunication nodes or wireless data transmission network nodes, such as WiFi, or meshed networks. The device can perform as both a flow sensor and a power source needed for transmitting obtained sensor information. Alternatively, it can be used in flying vehicles and devices. The draughts and airflows present at higher altitudes can be captured. The same is applicable for underwater currents and submarine vessels.

For example, hundreds or thousands of small generating cells, implemented as roof panels, can become a virtually maintenance-free source of electrical power, making it a much better alternative to costly solar panels. Unlike previously reported power generators, the device of the present teachings is capable of operating under a wide range of flow conditions. It is capable of operating both at low and very high flow velocities, without any additional damage-prevention equipment. The device does not include any massive elements which can be dangerous when detached in case of failure under extreme conditions. The device does not require any rotating, friction, grinding parts, or flexible membranes to provide quiet, virtually maintenance-free, operation It is to be clearly understood that the wide variety of various tools and different types of devices may be powered by the generator disclosed herein. For example, any of the electrical power generating cells described herein may include any of the magnetic field sources, vibrating assemblies, lift reversal elastic elements or vortex shedding elastic elements described herein, or any combination of these elements manufactured individually or in bulk. Accordingly, the foregoing detailed description is to be clearly understood as being given by way of example only without limiting the scope of the invention.

The invention has been described with reference to specific embodiments thereof. It will, however, be evident that various modifications and changes may be made thereto without departing from the broader scope of the disclosure. As will be realized by one skilled in the art, the present disclosure is capable of other and different embodiments, and its details are capable of modifications in various obvious respects, all without departing from the disclosure. Accordingly, the drawings and description are to be regarded as illustrative in an illustrative rather than a restrictive sense.

INCORPORATION BY REFERENCE

All of the patents and publications cited herein are hereby incorporated by reference. Each of the applications and patents cited in this text, as well as each document or reference cited in each of the applications and patents (including during the prosecution of each issued patent; "application cited documents"), and each of the PCT and foreign applications or patents corresponding to and/or paragraphing priority from any of these applications and patents, and each of the documents cited or referenced in each of the application cited documents, are hereby expressly incorporated herein by reference.

The references cited herein throughout, to the extent that they provide exemplary procedural or other details supplementary to those set forth herein, are all specifically incorporated herein by reference.

What is claimed is:

1. A device for generating electrical power from a flow, said device comprising:
   at least one elastic element for placing into the flow, said elastic element having one end fixed to a base and another free end is in a free motion caused by the flow;
   at least one conductor, wherein said at least one conductor is attached to said at least one elastic element; wherein the conductor comprises an active portion and a passive portion; wherein the elastic element and at least some portion of the conductor are substantially perpendicular to the base;
   and a magnetic field source configured to apply a magnetic field to said at least one conductor with the active portion at the free end being exposed to the magnetic field; a direction of the magnetic field being substantially perpendicular to the active portion; wherein said elastic element is configured to oscillate in response to said flow, causing displacements of the active portion in said magnetic field, the displacements being substantially perpendicular to the direction of the magnetic field, said magnetic field inducing an electromotive force in the conductor.

2. The device of claim 1, wherein said active portion is configured for maximum electromotive force induction therein and said passive portion is configured for minimum electromotive force induction therein.

3. The device of claim 1, wherein said flow is an air flow.

4. The device of claim 1, wherein said at least one elastic element is in a quasi-stationary breezon state, the breezon being an exited state of a vibrating assembly and characterized by a varying amplitude and a constant vibrating mode or a combination of the vibrating modes.

5. The device of claim 1, wherein an orientation of said vibrating assembly with respect to the flow is chosen to maximize the value of the linear velocity of the vibration of said vibrating assembly, the orientation of said vibrating assembly with respect to the flow including the orientation of the elastic element with respect to the flow.

6. The device of claim 1, further comprising a flow-controlling element for adjusting the velocity of said flow and the direction of said flow in proximity of said elastic element.

7. The device of claim 1, comprising at least two of said elastic elements.

8. An electrical power generating system, said system comprising:
   at least two devices for generating electrical power from a flow, said devices being electrically connected, each device comprising:
   at least one vibrating assembly for placing into said flow, said vibrating assembly comprising at least one elastic element for placing into said flow,
   said elastic element having one end fixed to a base and another free end is in a free motion caused by the flow;
   at least one conductor, wherein said at least one conductor is attached to said at least one elastic element; wherein the conductor comprises an active portion and a passive portion; wherein the elastic element and at least some portion of the conductor are substantially perpendicular to the base;
   and a magnetic field source configured to apply a magnetic field to said at least one conductor with the active portion at the free end being exposed to the magnetic field; a direction of the magnetic field being substantially perpendicular to the active portion; wherein said elastic element is configured to oscillate in response to said flow, causing displacements of the active portion in said magnetic field, the displacements being substantially perpendicular to the direction of the magnetic field, said magnetic field inducing an electromotive force in the conductor.

9. The system of claim 8, wherein said conductor comprises an active portion and a passive portion, and wherein said active portion is configured for maximum electromotive force induction therein and said passive portion is configured for minimum electromotive force induction therein.

10. The system of claim 8, further comprising an electrical scheme for processing said electromotive force, said electrical scheme comprising electromotive force rectifying circuit.

11. The system of claim 8, wherein said circuit provides a single polarity electromotive force for aggregating said electromotive forces from said at least two devices, the electromotive force resulting from a rectified pulsatory voltage, the rectified pulsatory voltage being of the same polarity.

12. The system of claim 8, wherein the vibrating assembly is the optimal vibrating assembly providing the maximum energy conversion efficiency from the flow, the optimal vibrating assembly including:
   elastic element of the optimal mass, elasticity, resilience, geometrical shape and size;
   conductor element of the optimal shapes, material, size, number of elements and proximity to the magnet;
   magnet of the optimal shape, material, size or number of elements.

13. The system of claim 8, wherein said devices are electrically connected in-series.

14. The system of claim 8, wherein said devices are electrically connected in-parallel.

15. The system of claim 8, wherein at least one component of said devices is micro-fabricated.

16. The system of claim 8, wherein said devices are combined into an array.

17. The system of claim 8, wherein said array has an arrangement substantially possessing a three-fold symmetry.

18. The system of claim 8, wherein said array has an arrangement substantially possessing a two-fold symmetry.

19. A method for generating electricity, the method comprising:
   placing into a flow an elastic element and
   a conductor,
   said elastic element having one end fixed to a base and another free end is in a free motion caused by the flow; said conductor attached to said elastic element; wherein the conductor comprises an active portion and a passive portion; wherein the elastic element and at least some portion of the conductor are substantially perpendicular to the base; and
   applying a magnetic field to the active portion, having a direction of the magnetic field being substantially perpendicular to the active portion;
   having the elastic element configured to oscillate in response to said flow, causing displacements of the active portion in the magnetic field, the displacements being substantially perpendicular to the direction of the magnetic field, and
   inducing an electromotive force in the conductor using the magnetic field.

20. The method of claim 19, further comprising placing a source of said magnetic field in proximity to said conductor.

21. The method of claim 19, further comprising inducing a quasi-stationary breezon state in said at least one elastic element.

22. The method of claim 19, further comprising rectifying said electromotive force.

23. The method of claim 22, further comprising combining said electromotive force with another electromotive force, said combining step following said rectifying step.

* * * * *